US012437734B1

(12) United States Patent
Pirozzi

(10) Patent No.: US 12,437,734 B1
(45) Date of Patent: Oct. 7, 2025

(54) PLECTRUM GRIP

(71) Applicant: Garry Pirozzi, Sault Ste. Marie (CA)

(72) Inventor: Garry Pirozzi, Sault Ste. Marie (CA)

( * ) Notice: Subject to any disclaimer, the term of this patent is extended or adjusted under 35 U.S.C. 154(b) by 278 days.

(21) Appl. No.: 18/199,933

(22) Filed: May 20, 2023

(51) Int. Cl.
*G10D 3/173* (2020.01)

(52) U.S. Cl.
CPC .................................... *G10D 3/173* (2020.02)

(58) Field of Classification Search
CPC ................................ G10D 3/173; G10D 3/00
See application file for complete search history.

(56) References Cited

U.S. PATENT DOCUMENTS

| | | | |
|---|---|---|---|
| 5,610,349 | A | 3/1997 | Fogarty et al. |
| 6,040,512 | A | 3/2000 | Polley |
| 6,417,431 | B1 | 7/2002 | Wilkinson |
| 7,186,908 | B2 | 3/2007 | Hodesh et al. |
| D607,920 | S | 1/2010 | Bartel |
| 8,076,560 | B2 | 12/2011 | McKee |
| D654,532 | S | 2/2012 | Morales |
| 8,764,898 | B2 | 7/2014 | Hobbs et al. |
| 9,691,365 | B2 | 6/2017 | Pascale |
| 10,418,004 | B1 | 9/2019 | Tomasi et al. |
| 2002/0108483 | A1 | 8/2002 | Smith |
| 2008/0110319 | A1 | 5/2008 | Morris |
| 2010/0180748 | A1 | 7/2010 | Frederick |
| 2014/0238215 | A1 | 8/2014 | Paterson |

FOREIGN PATENT DOCUMENTS

DE 202010010878 U1 * 11/2010 ............. G10D 3/163

* cited by examiner

*Primary Examiner* — Kimberly R Lockett
(74) *Attorney, Agent, or Firm* — Cramer Patent & Design, PLLC.; Aaron R. Cramer

(57) ABSTRACT

A plectrum grip for guitar players, having a body with a cavity that creates a space between a plectrum and the grip. The device aims to provide a better grip and produce a brighter and more consistent sound than plucking with a standard plectrum. The grip may also include a gripping material to prevent slipping and may taper in width from the grip first end to the grip second end. The cavity fully encapsulates at least half of the plectrum, and the inner surface may be lined with an adhesive to prevent the plectrum from dislodging.

1 Claim, 4 Drawing Sheets

PLECTRUM GRIP

RELATED APPLICATIONS

None.

FIELD OF THE INVENTION

The present invention relates generally to a grip and more specifically to a grip for a plectrum that may be added to an existing plectrum.

BACKGROUND OF THE INVENTION

A plectrum, also known as a guitar pick, is a small tool used to strum or pluck the strings of a guitar or similar stringed instrument. Guitar picks come in a variety of shapes, sizes, and materials, but they all serve the same purpose of helping the player produce a clear and consistent sound.

One popular variation of the guitar pick is the textured guitar grip pick. This type of pick features a textured or roughened surface on one or both sides, providing a better grip for the player's fingers. While such guitar picks are widely available, having a unitary guitar pick which incorporates a textured surface into the physical body of the guitar pick may not be suitable for every guitar player.

Oftentimes, a guitar player has a favorite guitar pick that lacks texture. Rather than purchase a different guitar pick, the guitar player may merely wish to incorporate a textured surface to an otherwise smooth surfaced guitar pick. The development of the plectrum pick fulfills this need in a manner that is useful and cost-effective.

SUMMARY OF THE INVENTION

To achieve the above and other objectives, the present invention provides for a plectrum grip, which has a body with a thin wall having an outer surface and an inner surface. The body includes a cavity that creates a space between the inner surface of the body and an opening of the body at the grip second end. The plectrum grip is designed to offer a better grip for the user and to produce a bright and more consistent sound compared to plucking the strings with bare fingers.

The plectrum grip may also include a gripping material on the outer surface of the body, which is adhered, attached, embedded, bonded, or otherwise formed to resist and/or prevent slipping of the user's fingers. The grip may taper from a larger first width at the grip first end, where it includes a dome and flares outward on both sides immediately subjacent the apex of the dome, to a smaller second width at the grip second end. Additionally, the cavity is configured to fully encapsulate at least one-half of the plectrum, and the inner surface may be lined with an adhesive to resist and/or prevent the plectrum from dislodging from the plectrum grip.

BRIEF DESCRIPTION OF THE DRAWINGS

These and other features, aspects, and advantages of the present disclosure will become better understood with regard to the following description, appended claims, and accompanying drawings where:

DESCRIPTIVE KEY

Figure 1:
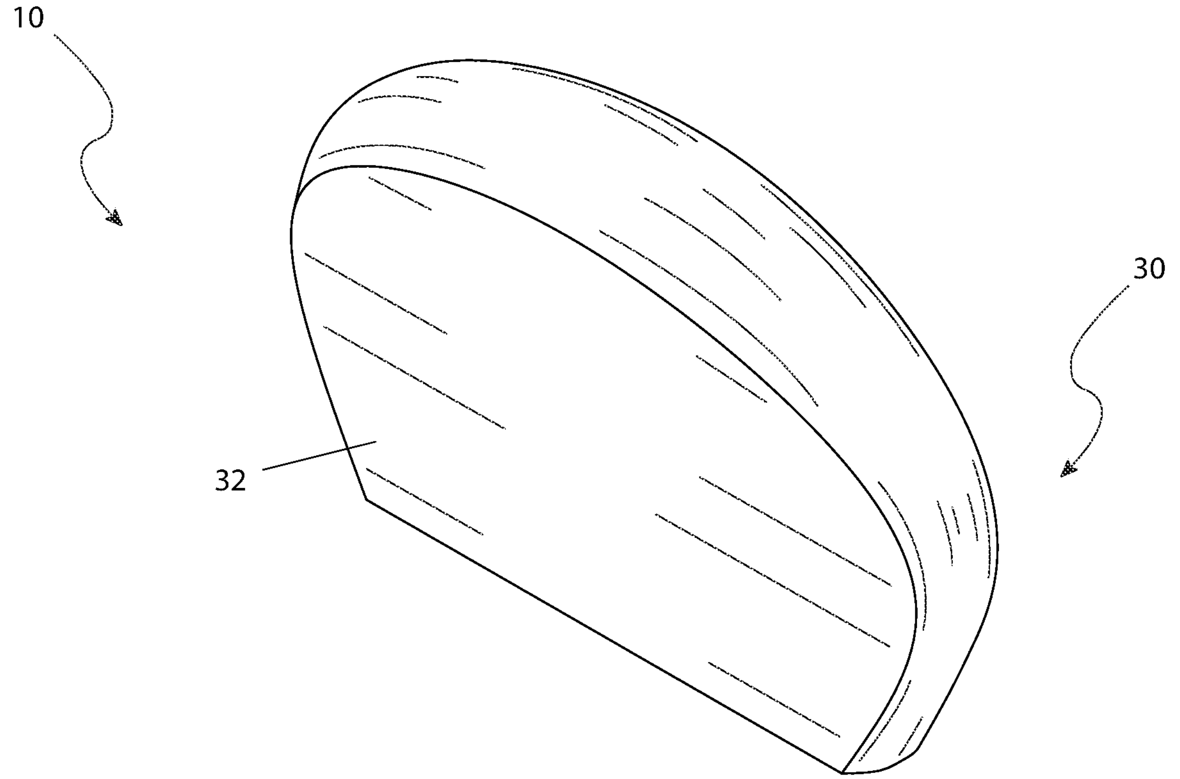
FIG. 1 is a top right perspective view of a plectrum grip, according to an embodiment of this disclosure.
Figure 2:
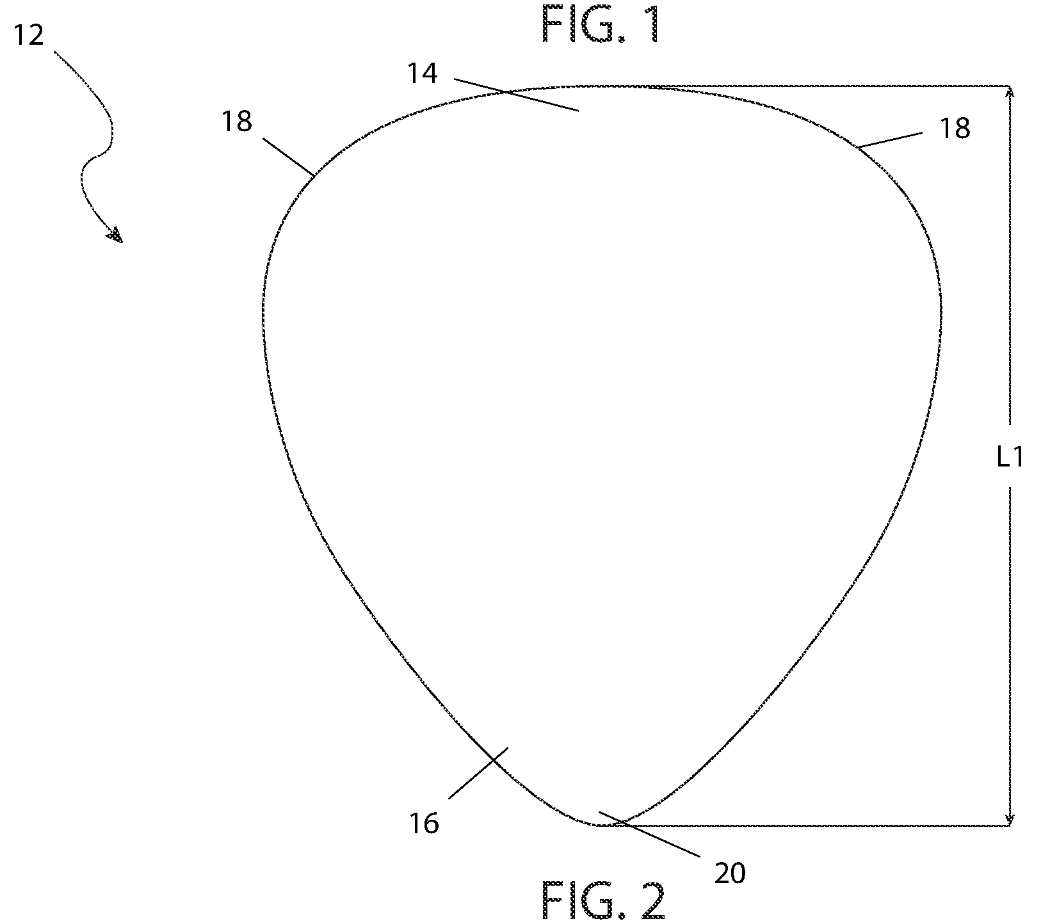
FIG. 2 is a side view of a typical plectrum, according to an embodiment of this disclosure.

10 plectrum grip
12 plectrum
14 plectrum top end
16 plectrum bottom end
18 corner
20 tip
30 body
32 outer surface
34 inner surface
36 gripping material
38 cavity
40 grip top end
42 grip bottom end
L1 first length
L2 second length
W1 first width
W2 second width DETAILED DESCRIPTION The following disclosure is provided to describe various embodiments of a plectrum grip 10 used for covering a portion of a plectrum 10 to provide a better grip thereof. Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present disclosure will now be described in detail, without limitation. Skilled readers should not view the inclusion of any alternative labels as limiting in any way.

Referring now to FIGS. 1-6, an illustrative plectrum grip 10 is now be discussed in more detail. Typically, a plectrum, also known as a pick, is used for stringed instrument like a guitar. A plectrum 12 is generally made of one (1) uniform material, for example: plastic, rubber, felt, tortoiseshell, wood, metal, glass, tagua, and stone. A plectrum 12 is used to create chords or to sound individual notes on a guitar by a user performing a strumming motion of the plectrum 12 on the strings of the guitar. Playing a guitar with a plectrum 12 produces a bright sound compared to plucking with the fingertip. A plectrum 12 also offers a greater contrast in tone across different plucking locations; for example, the difference in brightness between plucking the string or strings close to the bridge of the guitar and plucking the string or strings close to the neck of the guitar is much greater when using a plectrum 12 compared to a fingertip.

The plectrum 12 typically is a unitary structure that extends between a plectrum first end 14 and a plectrum second end 16 to define a first length L1. The plectrum 12 is shaped as an acute isosceles triangle with two (2) equal corners 18 located at the plectrum first end 14 that are rounded and a tip 20 located at the plectrum second end 16 which is less rounded. After lengthy use, the plectrum 12 may wear down the skin of the user's fingers. As such, the plectrum grip 10 may be used with plectrum 12, as described herein.

Referring now more closely to FIGS. 1, 3, 6, and 7, the plectrum grip 10 includes a body 30 and a cavity 38, the cavity 38 being in communication with the environment. The body 30 is typically a thin wall having an outer surface 32 and an inner surface 34 and includes a second length L2 measuring between the grip first end 40 and a grip second end 42. This second length L2 is smaller than the first length L1 of the plectrum 12 such that the tip 20 thereof remains exposed when the plectrum grip 10 is attached thereto. The body 30 includes an outer surface 32 and an inner surface 34. The outer surface 32 in certain embodiments, such as that shown in FIG. 4, may further include a gripping material 36 configured to resist and/or prevent slipping of the user's fingers. Such gripping material 36 may be adhered, attached, embedded, bonded, or otherwise formed with the outer surface 32.

Figure 5:
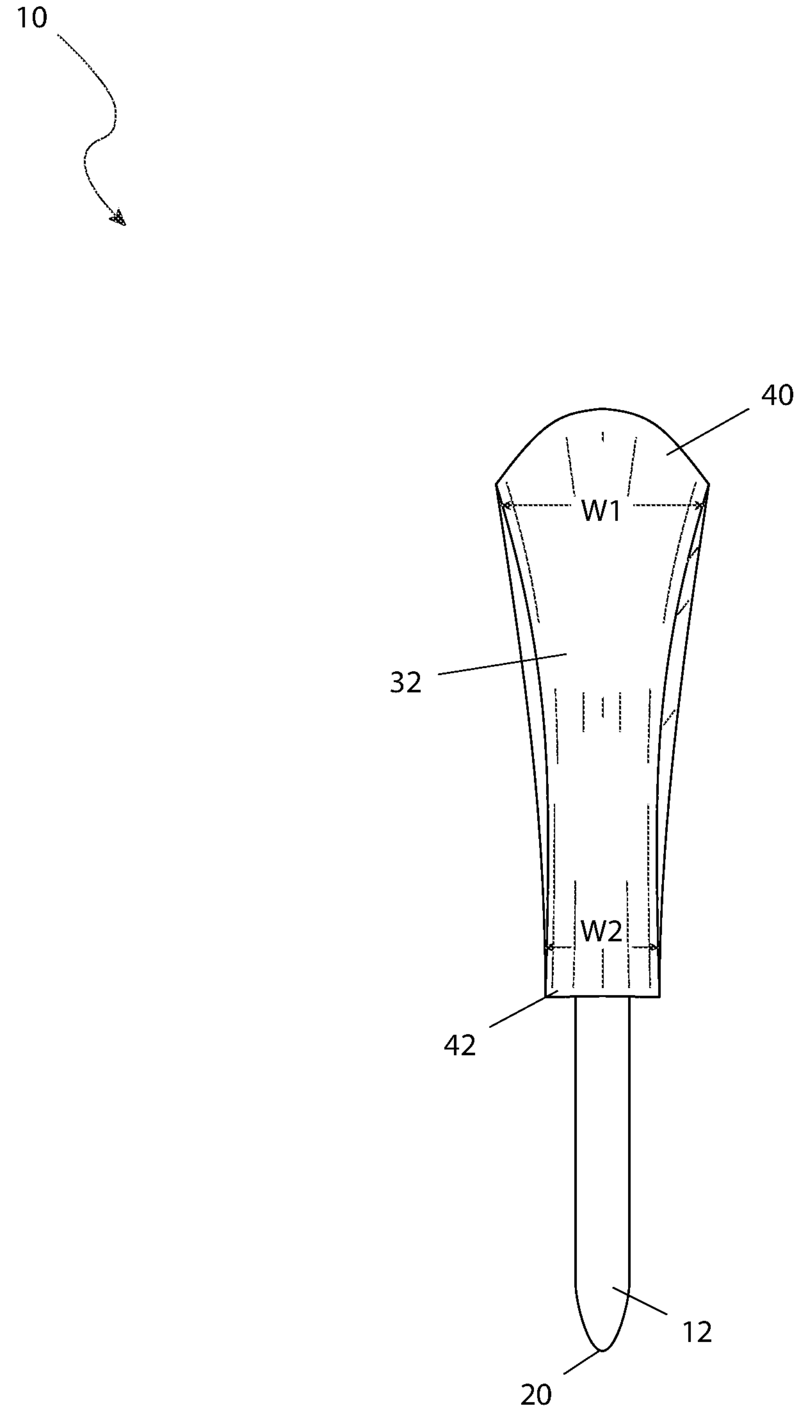
FIG. 5 is a side elevation view of a plectrum grip in use with a plectrum, according to an embodiment of this disclosure.
Figure 6:
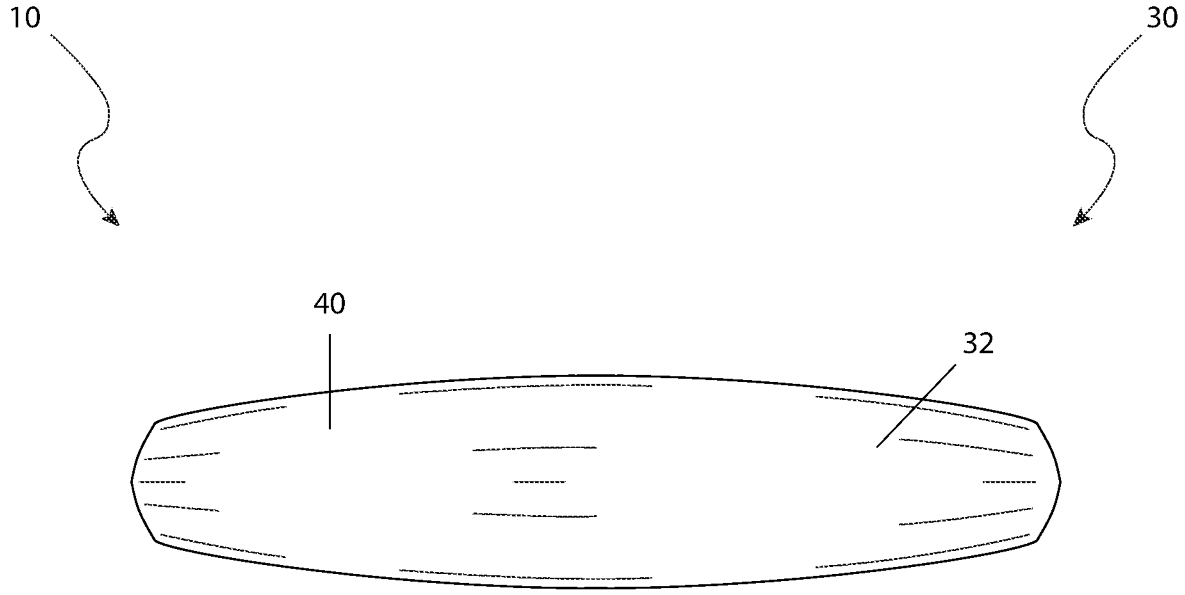
FIG. 6 is a top view of a plectrum grip, according to an embodiment of this disclosure.

Referring now more closely to FIG. 5, the side elevation of a plectrum grip 10 fully covering a plectrum 12, it can be seen that the plectrum grip 10 extends between the grip first end 40 and the grip second end 42. The grip first end 40 is domed and flares outward on both sides immediately subjacent the apex of the dome to a define a first width W1 approximately the maximum overall width of the body 30. At the grip second end 42 the sides of the body 30 coextensively terminate, with an opening, and defining a second width W2. The body 30 is shaped such that the first width W1 tapers to the second width W2, as shown in FIG. 5. The plectrum grip 10 is configured to slide over the plectrum 12 such that the tip 20 fully resides externally from the body 30, as shown in FIG. 5. Further, it is appreciated that a minimal or a negligible gap exists between the inner surface 34 of the body 30 and the plectrum 12, or even further, that a small amount or friction exists and can be a desired benefit therebetween. The first width W1 can be fashioned to provide a more ergonomic grip for the user. The plectrum grip 10 is sized to slide over the plectrum 12 while maintaining a snug fit therewith.

Figure 3:
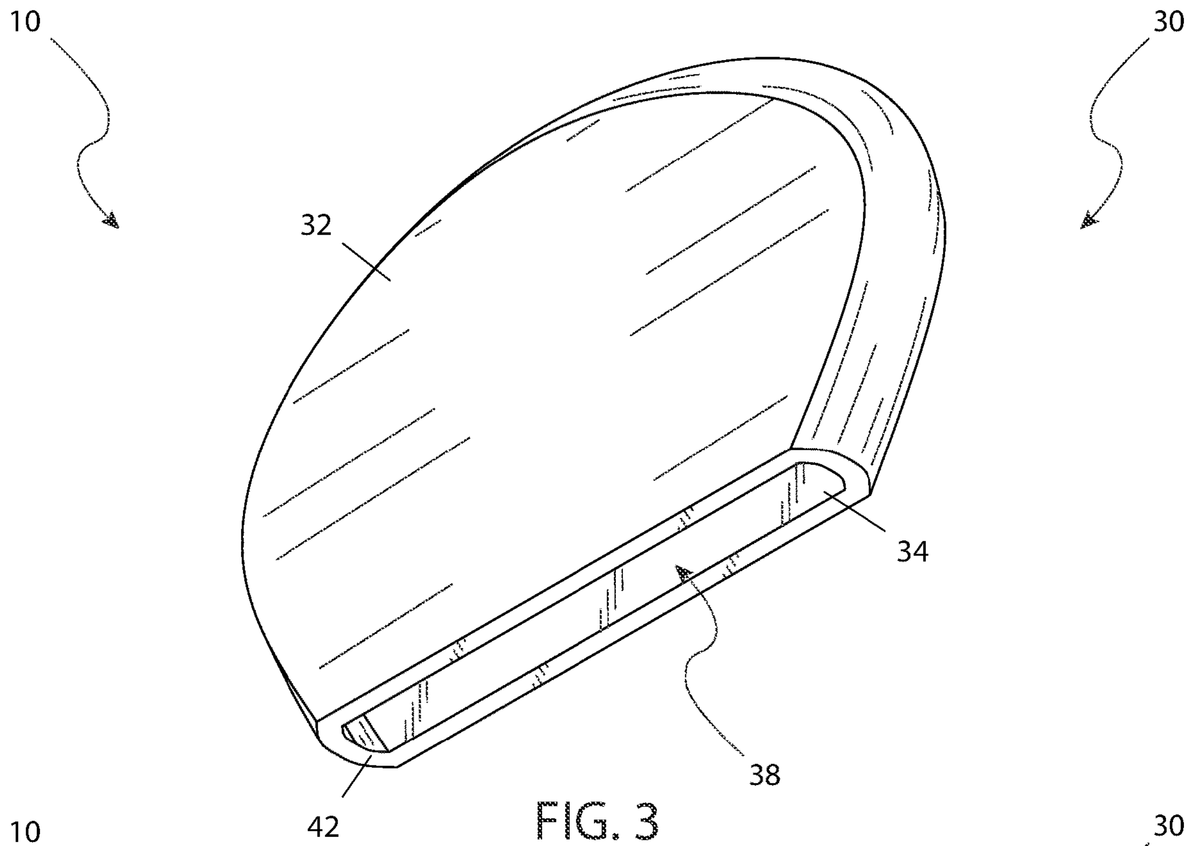
FIG. 3 is a bottom right perspective view of a plectrum grip, according to an embodiment of this disclosure.
Figure 4:
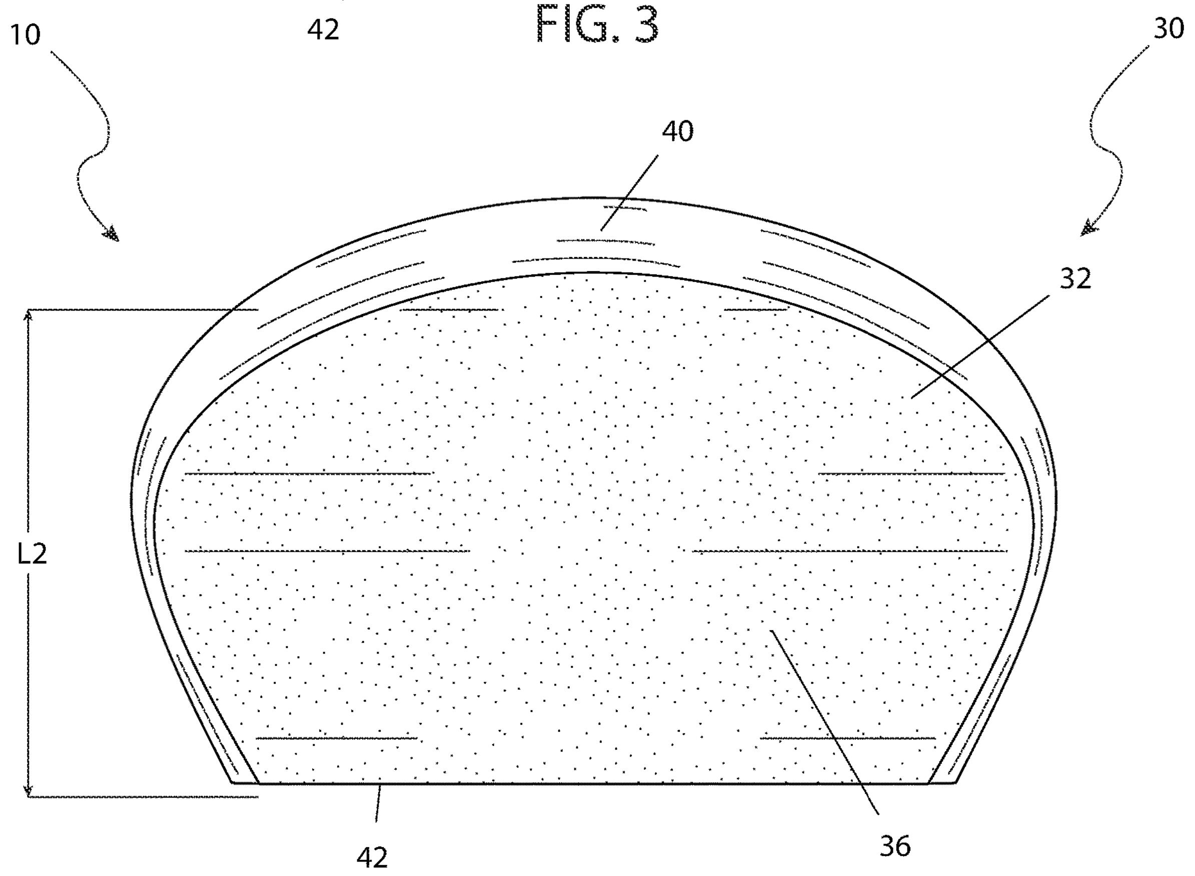
FIG. 4 is a top front perspective view of a plectrum grip, according to embodiment of this disclosure.
Figure 7:
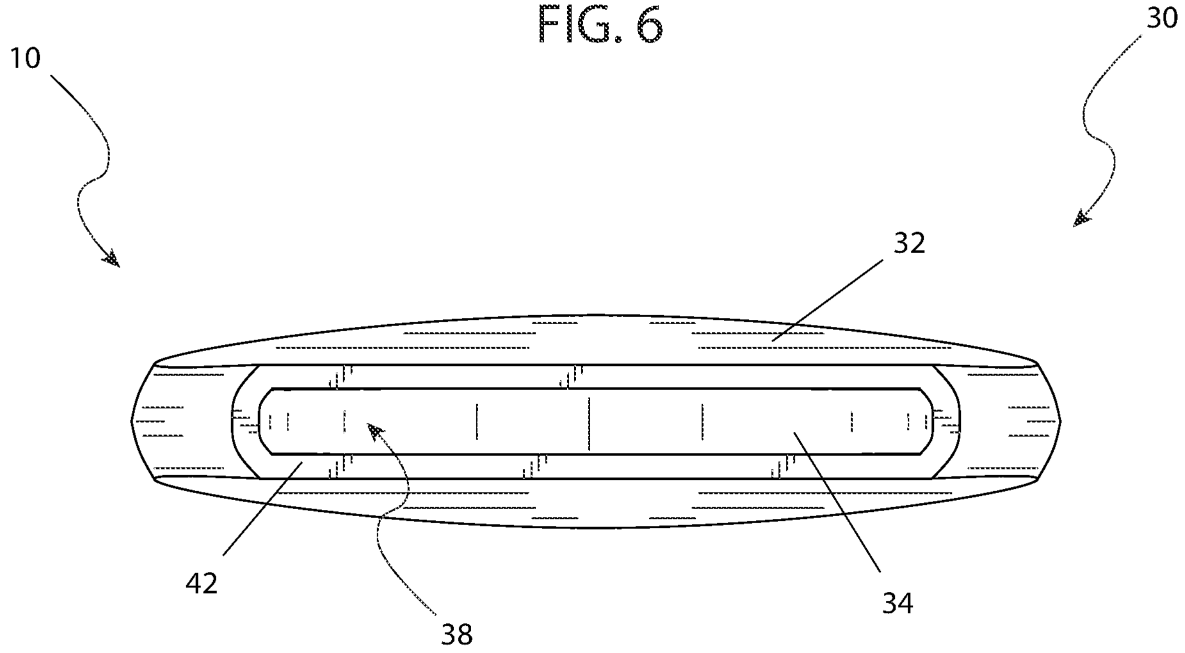
FIG. 7 is a bottom view of a plectrum grip, according to an embodiment of this disclosure.

The cavity 38, as shown in FIGS. 3 and 7, is defined as the space between the inner surfaces 34 of the body 30, and the opening of the body 30 at the grip second end 42. The cavity 38 is configured for full encapsulation of a significant portion (e.g., at least one-half (½) of a plectrum 12), as shown in FIG. 5. In some embodiments, the inner surface 34 may be lined with an adhesive to resist and/or prevent the plectrum 12 from dislodging from plectrum grip 10.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

The invention claimed is:

1. A plectrum grip consisting of:

a unitary body formed as a thin wall having an outer surface and an inner surface, the body extending from a grip first end to a grip second end along a second length that is less than a first length of a plectrum; and, a cavity within the body defined between the inner surface and an opening at the grip second end, the cavity configured to slidably and removably receive at least one-half of the plectrum such that a tip of the plectrum resides externally from the body when fully inserted; and, wherein the body flares outward adjacent the grip first end to define a first width that is greater than a second width at the grip second end, such that the body tapers from the first width to the second width;

wherein the inner surface of the body includes a frictional lining or adhesive configured to resist dislodgment of the plectrum from the cavity during use; and, wherein the outer surface of the body includes a gripping material that is adhered, embedded, or formed with the outer surface and configured to resist slipping from a user's fingers; and wherein a minimal gap or frictional engagement is present between the inner surface and the plectrum to provide a snug fit without perceptibly diminishing haptic feedback to the user during strumming.

* * * * *